July 17, 1973 J. JUNG 3,746,510
METHOD OF SEPARATING CARBON FROM ALKALI AND ALKALI EARTH METALS
Filed June 30, 1971
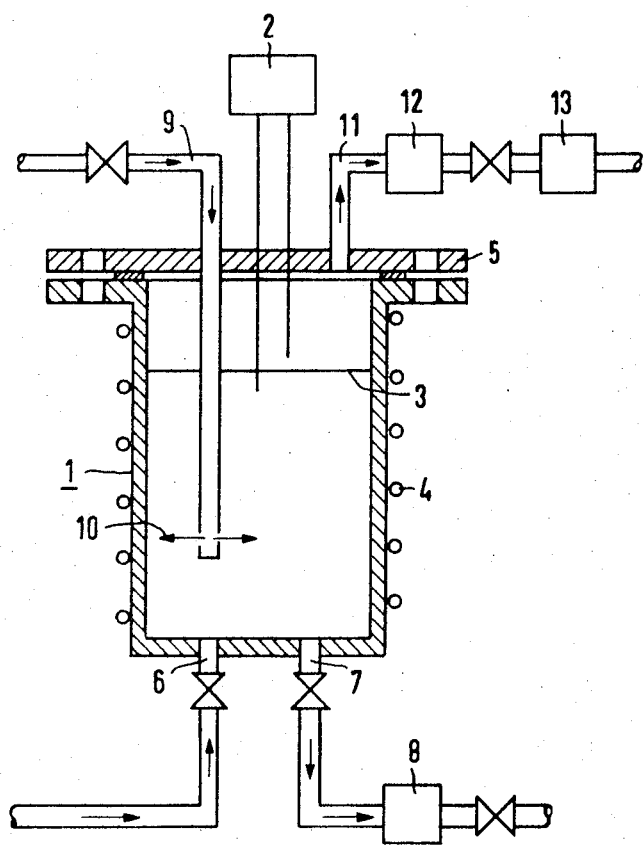

United States Patent Office 3,746,510
Patented July 17, 1973

3,746,510
METHOD OF SEPARATING CARBON FROM ALKALI AND ALKALI EARTH METALS
Jurgen Jung, Bensberg, Germany, assignor to Interatom Internationale Atomreaktorbau G.m.b.H., Bensberg, Cologne, Germany
Filed June 30, 1971, Ser. No. 158,248
Claims priority, application Germany, July 23, 1970, P 20 36 558.6
Int. Cl. G01n *33/20*
U.S. Cl. 23—230 R    6 Claims

ABSTRACT OF THE DISCLOSURE

A method of separating carbon from alkali and alkali earth metals. This method is particularly suitable for detecting and measuring carbon activity in the metal. The method comprises passing a hydrogen containing gas through a liquid alkali or alkali earth metal and thereafter separating the methane which results from the reaction of hydrogen with the carbon in the liquid metal.

---

The present invention relates to a method for separating carbon from alkali and alkali earth metals, particularly for detecting and/or measuring the carbon activity. The carbon activity indicates the carbon content capable of a chemical reaction.

The knowledge of the carbon content, the operational monitoring and the distance from the carbon are of great importance in the technology of the alkali and alkali earth metals since a carburization or decarbonization of the structural materials may lead to damage and destruction of said materials. In sodium installations for nuclear energy technique, a carbon transport could be observed between austenitic and ferrite steel as well as between hot and cold places of the same material. The difference in carbon concentration, not decisive for this transport, but rather the difference in chemical potentials which, in extreme cases, means that a steel with higher carbon content may decarbonize a steel with lower carbon concentration.

Many attempts have been made to remove carbon present in sodium, through so-called heat traps. To this end, steel sheets with low carbon concentration are installed into the sodium cycle and heated to high temperatures, in order to accelerate the carbon absorption process. This method is expensive and requires either a regular exchange of sheets loaded with carbon or very large surfaces.

U.S. Pat. No. 3,451,256, dated June 24, 1969, discloses an apparatus for determining the carbon in liquids. In this measuring probe, the carbon is diffused through thin walled (0.25 mm. thick) iron or nickel tubes which are dipped into sodium at about 760° C., and is then converted for analysis by moist argon and hydrogen and detected with a flame ionization detector. Disadvantages associated with this method are the high operational temperature and the delayed response time due to the slow diffusion through solid bodies.

According to USAEC report BNL 50190, work has been done on an EMK cell for determining the carbon conducted in sodium. This cell uses graphite as a reference electrode and calicum carbide as an electrolyte. No measuring results are available at this time concerning said method.

The report NAA–SR 8448 Chromatographic Analyses of Gases Over Liquid Sodium, by Johnson, relates to the conversion of carbon with hydrogen into methane, in the presence of sodium. The results of these tests were used only for determining the equilibrium constant and the sodium hydride activity.

It is an object of the invention to devise a method for separating carbon from alkali and alkali earth metals particularly for detecting and/or measuring the carbon activity.

To this end and in accordance with the present invention, hydrogen or hydrogen containing gas is passed, e.g. a mixture of inert gases and hydrogen, through the liquid metal, and the methane which results from the reaction of hydrogen and carbon is removed from the metal by conventional methods and then transported to a verification and/or measuring device, for example, a gas chromatograph or a flame ionization detector.

Tests have shown that when the liquid sodium has a temperature between 200° C. and 600° C., carbon will be detected. In order to keep the amount of sodium transported along by the gas to a minimum, it is advantageous for the temperature to remain below 450° C. With regard to the solubility of the sodium hydride, a partial hydrogen pressure of maximum 1 atmosphere is favorable.

It was further established that small amounts of oxygen is dissolved or chemically bound in the liquid metal, suffices for removing the carbon in said metal. It was found that the carbon content, which can be reacted, increases in the presence of oxygen.

Another feature of the present invention provides for the exact measuring of the carbon activity by guiding the hydrogen laden gas in a cycle via a determined or closed volume of the liquid metal, through a precipitation device and through a measuring device, until the equilibrium of the methane reaction is reached while keeping the temperature of the liquid metal constant.

According to another feature of the present invention, particularly for a quick proof that the carbon activity is on the increase, is to guide a constant current of the hydrogen laden gas, preferably in counter-current, through a partial current of the liquid metal. This special method offers a particularly quick and simple indication of a possible damage.

According to a further feature of the invention is to guide the liquid metal, following its contact with the hydrogen laden gas, past a diaphragm which is kept under vacuum and permeable to hydrogen. This known diaphragm helps to remove, from the liquid metal, part of the hydrogen which has not reacted with the carbon to form methane.

The present invention was developed for use in nuclear reactor plants cooled with liquid metal and for appropriate usage in laboratories, but can also be employed in the same sense for other uses in the technique associated with alkali and alkali earth metals, as well as their alloys. The advantages of these methods are the simple and fast measuring possibilities even at low temperatures, as well as the high sensitivity for the dissolved carbon, in the order of magnitude of $10^{-3}$ p.p.m. The verifying sensitivity of these methods is promoted by the fact that the conversion of even $10^{-6}$ g. carbon produces $1.9 \times 10^{-3}$ Nml. (milliliter expressed under normal conditions) methane, especially when one considers that $10^{-1}$ p.p.m. (by volume) methane, may be detected without difficulty in a gas mixture.

The invented methods not only point to a technically suitable way for verifying and measuring carbon but also to a way for removing the carbon from liquid metals, as well as for the production of pure methane.

The invention will be further described with respect to the drawing, which illustrates an example for the continuous verification of carbon activity in liquid sodium.

The sodium level 3 is kept constant in a reaction vessel 1, by measuring device 2 for measuring the filling level. The container 1 is adjustably heated by the heater 4 and is covered with the lid 5. A partial sodium flow, which stems from an installation not shown in detail, enters the container 1, at inlet 6 and leaves the container at 7, is freed from the dissolved hydrogen at 8 and flows back into the installation. A hydrogen containing gas flows through pipe line 9 into the container 1, far below the sodium level, and reaches the sodium through several openings 10 in line 9. The hydrogen containing gas collects together with the resultant methane, above the sodium level and first passes via line 11, across separation (precipitation) device 12, wherein the sodium which had been carried along in the gas, is separated, arriving thereafter at measuring device 13 wherein the methane content is measured. The measuring device may be a flame ionization detector or a gas chromatograph.

I claim:

1. A method for separating carbon from alkali metals and alkali earth metals, particularly for detecting and measuring the carbon activity, which comprises the steps of: passing hydrogen containing gas through a liquid alkali or alkali earth metal containing carbon and separating methane which results from reaction of hydrogen and carbon.

2. The method of claim 1, wherein said liquid metal is contained in a closed volume, introducing any reaction products into a precipitation device and thereafter passing said products through a measuring device until equilibrium of said methane reaction is attained, while maintaining the temperature of the liquid metal constant.

3. The method of claim 1, wherein said liquid metal is sodium.

4. The method of claim 1, wherein a constant current of said hydrogen containing gas is passed through a partial current of said liquid alkali metal.

5. The method of claim 4, wherein said hydrogen containing gas is passed counter-current to the liquid alkali metal.

6. Apparatus adapted to measure the carbon content of liquid sodium including: a closed container; inlet means and outlet means for directing liquid sodium into and out of said container; means for passing hydrogen into said liquid sodium in said container; exit means above said sodium in said container, for removing gaseous products; and means for detecting the carbon content in said gaseous products.

References Cited

UNITED STATES PATENTS

| 2,987,912 | 6/1961 | Jacobson | 73—19 |
| 3,451,256 | 6/1969 | Kolodney | 23—253 R |

OTHER REFERENCES

Caplinger, W., Chem. Abstr., 71, 126359h, 1969.

MORRIS O. WOLK, Primary Examiner

R. M. REESE, Assistant Examiner

U.S. Cl. X.R.

23—253 R; 73—23